United States Patent
Lin et al.

(10) Patent No.: US 7,196,668 B2
(45) Date of Patent: Mar. 27, 2007

(54) WIRELESS COMMUNICATION SYSTEM OF NOTEBOOK COMPUTER HAVING ANTENNA ARRAY MODULE

(75) Inventors: Yung-Sen Lin, Taipei (TW); Tzu-Lung Chuang, Taipei (TW)

(73) Assignee: Acer Inc., Taipei (TW)

( * ) Notice: Subject to any disclaimer, the term of this patent is extended or adjusted under 35 U.S.C. 154(b) by 35 days.

(21) Appl. No.: 11/077,090

(22) Filed: Mar. 10, 2005

(65) Prior Publication Data
US 2006/0049993 A1 Mar. 9, 2006

(30) Foreign Application Priority Data
Sep. 7, 2004 (TW) .............................. 93127027 A

(51) Int. Cl.
*H01Q 1/24* (2006.01)
(52) U.S. Cl. ................................. 343/702; 343/700 MS
(58) Field of Classification Search ................ 343/702, 343/700 MS, 770; 342/418, 433
See application file for complete search history.

(56) References Cited
U.S. PATENT DOCUMENTS

| | | | | |
|---|---|---|---|---|
| 5,299,148 A * | 3/1994 | Gardner et al. | ............. | 702/196 |
| 5,497,161 A * | 3/1996 | Tsui | ........................... | 342/147 |
| 2002/0190902 A1 * | 12/2002 | Samson et al. | ............. | 342/418 |
| 2004/0257283 A1 * | 12/2004 | Asano et al. | ............... | 343/702 |
| 2005/0073460 A1 * | 4/2005 | Schmidt et al. | ....... | 343/700 MS |
| 2006/0033671 A1 * | 2/2006 | Chan et al. | ................. | 343/769 |

\* cited by examiner

*Primary Examiner*—Trinh Dinh

(57) ABSTRACT

A wireless communication system of a notebook computer includes a first antenna, an antenna array module and a wireless local area network (WLAN) module. The antenna array module includes a plurality of second antennas and a plurality of connectors electrically connected to the second antennas via corresponding signal transmission lines, wherein the distance between two adjacent second antennas is identical, and the length of each signal transmission line is equal. The wireless local area network (WLAN) module has a switch unit electrically connected to the first antenna and the antenna array module to select one of the first antenna and the antenna array module to receive/transmit a signal according to an operational mode of the WLAN module.

12 Claims, 4 Drawing Sheets

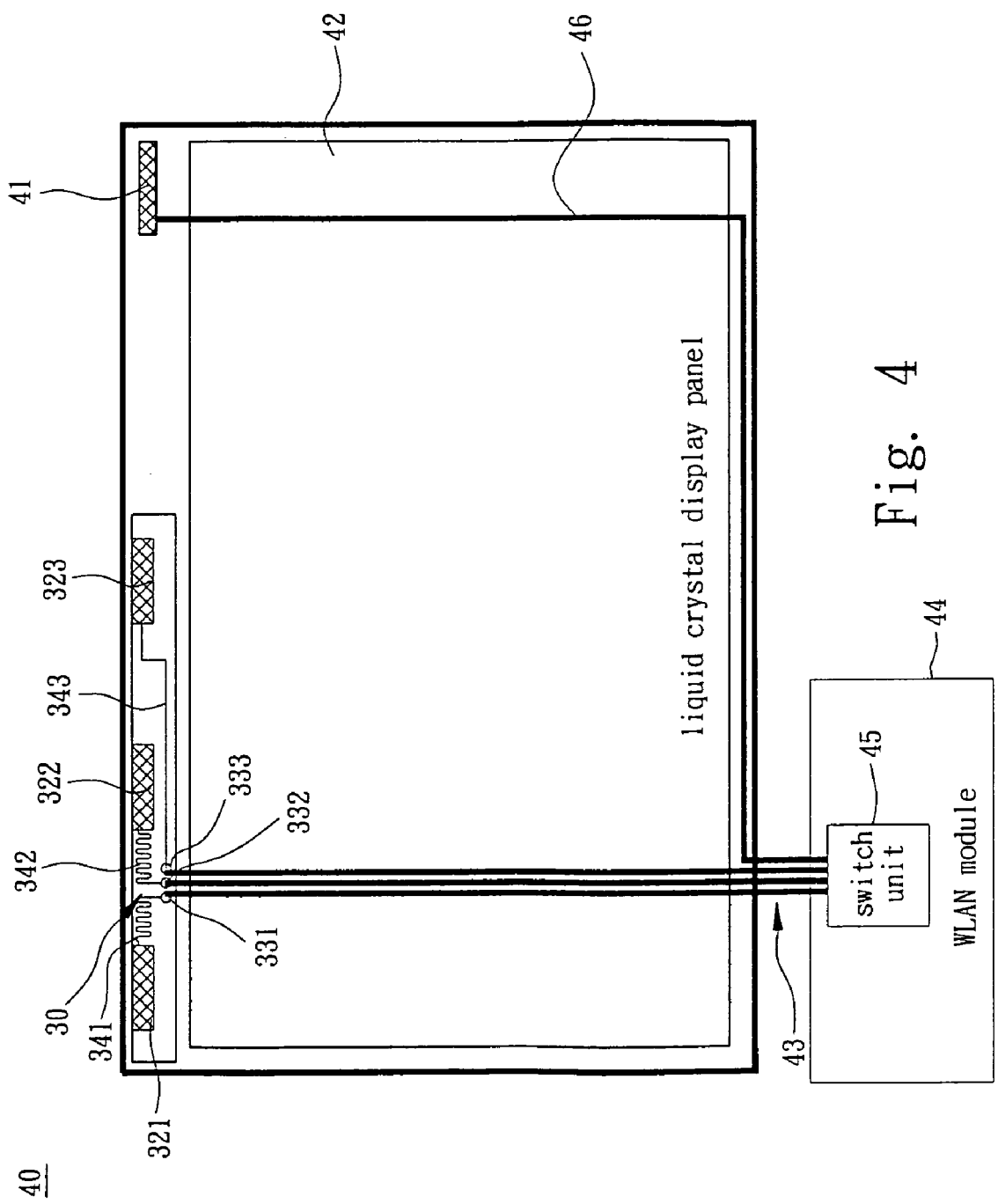

WIRELESS COMMUNICATION SYSTEM OF NOTEBOOK COMPUTER HAVING ANTENNA ARRAY MODULE

FIELD OF THE INVENTION

The present invention relates to a wireless communication system of a notebook computer, and more particularly to a wireless communication system of a notebook computer having an antenna array module.

BACKGROUND OF THE INVENTION

Nowadays, wireless communication networks have experienced great growth. In addition to mobile phone networks, wireless computer networks are now rapidly gaining in popularity. The introduction of the wireless local area network (WLAN) has allowed users to freely carry computing devices within the area of the WLAN while still being connected to the network.

The original WLAN standard IEEE 802.11 was designed to enable communications at 1–2 Mbps in a band around 2.4 GHz. In order to enable higher data rates, IEEE working groups have defined the 802.11a, 802.11b and 802.11g extensions to the original standard. The 802.11a standard, for example, enhances data rates up to 54 Mbps over short distances in a 5 GHz band. Whereas, the IEEE 802.11b protocol defines data rates up to 22 Mbps in the 2.4 GHz band.

Referring to FIG. 1, a schematic circuit block diagram of a WLAN module operated according to the IEEE 802.11 a/b/g protocol is shown. The WLAN module 10 comprises an antenna switch 11, a radio-frequency integrated circuit (RFIC) 12 and a baseband/media-access-control integrated circuit (BB/MAC IC) 13. One end of the WLAN module 10 is connected to a notebook computer, and the other end thereof is connected to antennas 15 via RF connectors 14.

When the WLAN module 10 is in a receiving mode, the two antennas 15 receive RF signals over the air, and transmit the RF signals to the RFIC 12 via the antenna switch 11. Since only one antenna is used according to the IEEE 802.11a/b/g protocol, in response to a control signal from the BB/MAC IC 13, the antenna switch 11 selects the desired one having better signal quality. Then, by means of the RFIC 12, the frequency of the RF signal outputted from the antenna switch 11 is reduced from high to low. The low-frequency signal is transmitted to the BB/MAC IC 13 for demodulation. The demodulated signal is transmitted to the notebook computer. On the contrary, in a transmitting mode, data from the notebook computer is processed and modulated by the BB/MAC IC 13. The modulated signal is amplified by the RFIC 12 to have a higher frequency. The high-frequency signal is then transmitted to the air via the desired antenna 15.

As known, according to the IEEE 802.11a/b/g protocol, data transmission rate for the WLAN communication can reach 54 Mbps. Nowadays, IEEE working groups have designed the IEEE 802.11 TGn protocol to enable communications up to 100 Mbps. The IEEE 802.11 TGn protocol is applicable to a multiple-input multiple-output (MIMO) technology. Referring to FIG. 2, a schematic circuit block diagram of a MIMO system is shown. At least two, e.g. three, antennas 15 are employed to receive RF signals in the same band. Each antenna 15 is electrically connected to a RFIC 12 via a RF connector 14. In a receiving mode, the RF signals received from the antennas 15 are reduced by the individual RFIC 12 from high frequency to low frequency. The low-frequency signal is transmitted to the BB/MAC IC 13 for demodulation. The demodulated signals are synchronously transmitted to the notebook computer. Whereas, in a transmitting mode, data from the notebook computer is processed and modulated by the BB/MAC IC 13. The modulated signal is amplified by the individual RFIC 12 to have a higher frequency. The high-frequency signal is then transmitted to the air via the antennas 15. In such manner, the data transmission rates in receiving/transmitting modes are increased.

For a purpose of enhancing capability of wireless communication and data transmission rates, a multiple-input multiple-output (MIMO) system is integrated into notebook computers. Generally, the antennas for supporting the MIMO system are disposed at different locations around the liquid crystal display panel of the notebook computer. In a case that three antennas are employed, the first one may be disposed at upper portion of the liquid crystal display panel, while the other two antennas are disposed at bilateral sides of the liquid crystal display panel. The operational settings of the WLAN module are dependent on the distance between the individual antenna and the RF connector. However, if the size of the liquid crystal display panel is changed, the operational settings of the WLAN module should be varied as well.

SUMMARY OF THE INVENTION

The present invention provides a wireless communication system of a notebook computer selective to receive/transmit RF signals in either a multiple-input multiple-output (MIMO) or an IEEE 802.11 a/b/g mode.

The present invention also provides an antenna array module disposed at the periphery of the liquid crystal display panel of the notebook computer and having a plurality of antennas for receiving/transmitting RF signals synchronously.

In accordance with a first aspect of the present invention, there is provided a wireless communication system of a notebook computer. The wireless communication system comprises a first antenna, an antenna array module and a wireless local area network (WLAN) module. The antenna array module comprises a plurality of second antennas and a plurality of connectors electrically connected to the second antennas via corresponding signal transmission lines, wherein the distance between two adjacent second antennas is identical, and the length of each signal transmission line is equal. The wireless local area network (WLAN) module has a switch unit electrically connected to the first antenna and the antenna array module to select one of the first antenna and the antenna array module to receive/transmit a signal according to an operational mode of the WLAN module.

In an embodiment, the second antennas, the connectors and the signal transmission lines are disposed in a substrate.

In an embodiment, the substrate is a printed circuit board or a ceramic substrate.

In an embodiment, the first antenna and the antenna array module are disposed at the periphery of the liquid crystal display panel.

In an embodiment, the signal is a RF data signal.

In an embodiment, the distance between two adjacent second antennas is in proportion to the wavelength of the signal.

In an embodiment, the connectors are FR connectors.

In an embodiment, the connectors are electrically connected to the WLAN module via a RF coaxial cable.

In an embodiment, the signal transmission lines are strip lines, micro strip lines or co-planar waveguide lines.

In an embodiment, the antenna array module is selected to receive/transmit the signal when operational mode of the WLAN module is a multiple-input multiple-output (MIMO) mode.

In an embodiment, either the first antenna or one of the second the antenna array module is selected to receive/transmit the signal when operational mode of the WLAN module is an IEEE 802.11 a/b/g mode.

In accordance with a second aspect of the present invention, there is provided an antenna array module of a notebook computer, the notebook computer comprises a liquid crystal display panel and a wireless local area network (WLAN) module. The antenna array module comprises a plurality of antennas, a plurality of connectors and a plurality of signal transmission lines. The distance between two adjacent antennas is identical. The connectors are electrically interconnected to the antennas and the WLAN module. The signal transmission lines connect the antennas to corresponding connectors. The length of each signal transmission line is equal.

The above contents of the present invention will become more readily apparent to those ordinarily skilled in the art after reviewing the following detailed description and accompanying drawings, in which:

BRIEF DESCRIPTION OF THE DRAWINGS

FIG. 4 is a wireless communication system of a notebook computer 40 using the antenna array module of FIG. 3.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
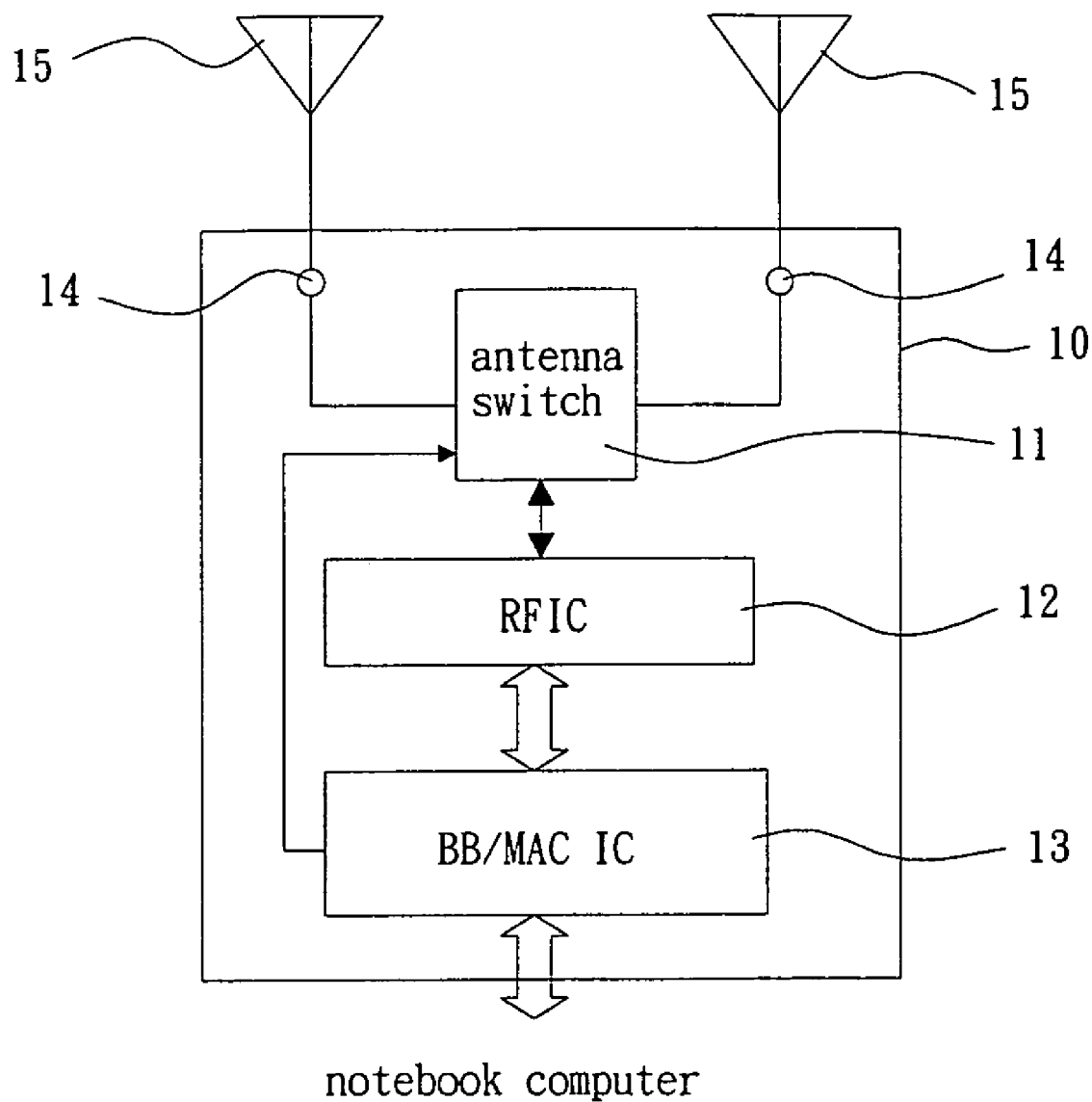
FIG. 1 is a functional block diagram illustrating a WLAN module operated in an IEEE 802.11a/b/g mode.
Figure 2:
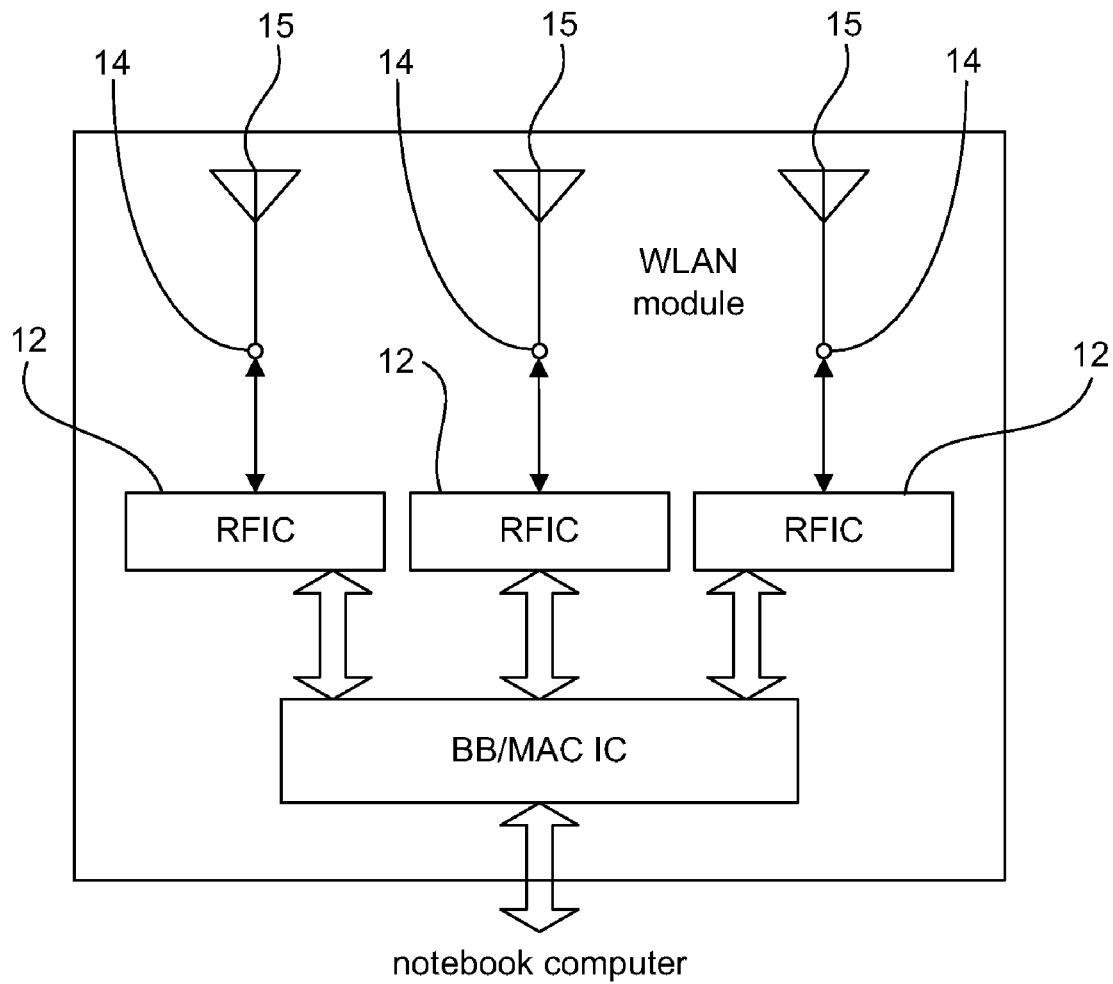
FIG. 2 is a functional block diagram illustrating a WLAN module operated in a multiple-input multiple-output (MIMO)
Figure 3:
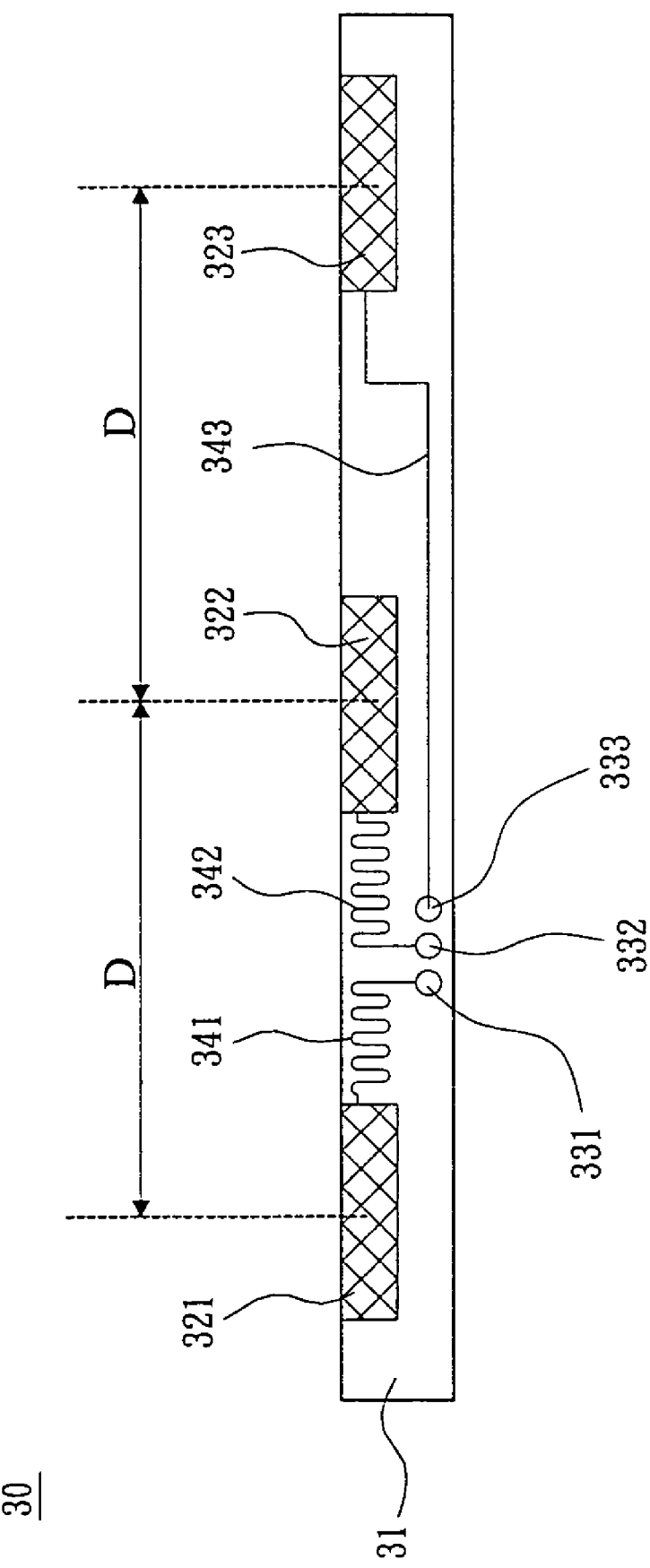
FIG. 3 is a schematic cross-sectional view of an antenna array according to a preferred embodiment of the present invention.

Referring to FIG. 3, a schematic cross-sectional view of an antenna array according to a preferred embodiment of the present invention is shown. The antenna array 30 can be applied to a WLAN module using the MIMO technology. The antenna array module 30 comprises three antennas 321~323, three RF connectors 331~333 and three signal transmission line 341~343, all of which are arranged in a substrate 31.

The substrate 31 may be a printed circuit board or a ceramic substrate.

The distance between the antennas 321 and 322 and the distance between the antennas 322 and 323 are identical. The distance D is equal to n×λ, where λ is wavelength of the RF signal to be received from the antenna. The wavelength λ of the RF signal is equal to the speed of light divided by the frequency thereof. For example, in a case that the frequency of the RF signal is 5 GHz, the wavelength λ thereof is about 6 cm. Whereas, in a case that the frequency of the RF signal is 2.5 GHz, the wavelength λ thereof is about 12 cm. The value n is a constant, e.g. 1, 1.5, 2, etc. Provided that the frequency of the RF signal is 5 GHz and n=1.5, the distance D=9 cm.

Each of the RF connectors 331~333 is connected to the respective one of the antennas 321~323 via the signal transmission line 341~343. The signal transmission line 341~343 are RF signal transmission lines, which are implemented by strip lines, micro strip lines or co-planar waveguide lines. Each of the signal transmission line 341~343 has equal length. Since the distance between two adjacent antennas is identical and each of the signal transmission line 341~343 has equal length, the RF signals received from the antennas 321~323 to the RF connectors 331~333 or transmitted from the RF connectors 331~333 to the antennas 321~323 are synchronous. Therefore, the process for demodulating the RF is simplified and the demodulating rate is increased accordingly.

Referring to FIG. 4, a Wireless communication system of a notebook computer 40 using the antenna array module 30 of FIG. 3 is illustrated. The antenna array module 30 of the wireless communication system may be disposed at the periphery of the liquid crystal display panel 42 of the computer notebook 40. For example, the antenna array module 30 is disposed at the top portion of the liquid crystal display panel 42. The antenna array module 30 is operated according to the multiple-input multiple-output (MIMO) protocol. The wireless communication system further comprises a single antenna 41 distant from the antenna array module 30, and a wireless local area network (WLAN) module 44. The single antenna 41 is operated according to the IEEE 802.11 a/b/g protocol. The WLAN module 44 comprises a switch unit 45. The switch unit 45 is connected to the RF connectors 331~333 of the antenna array module 30 via a RF coaxial cable 43 and to the single antenna 41 via another RF coaxial cable 46. Since the WLAN module 44 is connected to the antenna array module 30 and the single antenna 41, the WLAN module 44 can be operated in either an MIMO mode or an IEEE 802.11 a/b/g mode according to the switching state of the switch unit 45. In the MIMO mode, the single antenna 41 is turned off but the antenna array module 30 is conducted such that the antennas 321~323 of the antenna array module 30 receive/transmit the RF signals synchronously. On the contrary, when the WLAN module 44 is operated in the IEEE 802.11 a/b/g mode, either the single antenna 41 or one of the antennas 321~323 is selected to receive/transmit the RF signals.

As previously described, by using the antenna array module 30 of the present invention, the RF signals received from the antennas 321~323 to the RF connectors 331~333 or transmitted from the RF connectors 331~333 to the antennas 321~323 are synchronous. Therefore, even though the size of the liquid crystal display panel 42 is changed, the operational settings of the WLAN module 44 can be kept unchanged.

From the above description, it is understood that the antenna array module of the present invention is effective to simplify the process of demodulating the RF and enhancing the demodulating rate because the distance between two adjacent antennas is identical and each of the signal transmission line has equal length. In addition, the operational settings of the WLAN module remains unchanged even when the size of the liquid crystal display panel is changed. For enhancing flexibility, the wireless communication system of the present invention can be operated in either an MIMO mode or an IEEE 802.11 a/b/g mode as required.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless communication system of a notebook computer, said wireless communication system comprising:
    a first antenna;
    an antenna array module comprising a plurality of second antennas and a plurality of connectors electrically connected to said second antennas via corresponding signal transmission lines, wherein the distance between two adjacent second antennas is identical, and the length of each signal transmission line is equal; and
    a wireless local area network (WLAN) module having a switch unit electrically connected to said first antenna and said antenna array module to select said antenna array module to receive/transmit a signal according to a first operational mode of said WLAN module and select either said first antenna or one of said second antennas in said antenna array module to receive/transmit a signal according to a second operational mode of said WLAN module.

2. The wireless communication system according to claim 1 wherein said second antennas, said connectors and said signal transmission lines are disposed in a substrate.

3. The wireless communication system according to claim 2 wherein said substrate is a printed circuit board or a ceramic substrate.

4. The wireless communication system according to claim 1 wherein said first antenna and said antenna array module are disposed at the periphery of a liquid crystal display panel of said notebook computer.

5. The wireless communication system according to claim 1 wherein said signal is a RF data signal.

6. The wireless communication system according to claim 1 wherein the distance between two adjacent second antennas is in proportion to the wavelength of said signal.

7. The wireless communication system according to claim 1 wherein said connectors are FR connectors.

8. The wireless communication system according to claim 7 wherein said connectors are electrically connected to said WLAN module via a RF coaxial cable.

9. The wireless communication system according to claim 1 wherein said signal transmission lines are strip lines, micro strip lines or co-planar waveguide lines.

10. The wireless communication system according to claim 1 wherein said first operational mode of said WLAN module is an multiple-input multiple-output (MIMO) mode.

11. The wireless communication system according to claim 1 wherein said second operational mode of said WLAN module is an IEEE 802.11 a/b/g mode.

12. A wireless communication system of a notebook computer, said wireless communication system comprising:
    a first antenna;
    an antenna array module comprising a plurality of second antennas and a plurality of connectors electrically connected to said second antennas via corresponding signal transmission lines, wherein the distance between two adjacent second antennas is identical, and the length of each signal transmission line is equal; and
    a wireless local area network (WLAN) module having a switch unit electrically connected to said first antenna and said antenna array module to select one of said first antenna and said antenna array module to receive/transmit a signal according to an operational mode of said WLAN module;
    wherein said antenna array module is selected to receive/transmit said signal when operational mode of said WLAN module is a multiple-input multiple-output (MIMO) mode, and either said first antenna or one of said second antennas in said antenna array module is selected to receive/transmit said signal when operational mode of said WLAN module is an IEEE 802.11 a/b/g mode.

* * * * *